United States Patent [19]
Lucienne

[11] Patent Number: 5,697,481
[45] Date of Patent: Dec. 16, 1997

[54] DOUBLE DAMPED FLYWHEEL, ESPECIALLY FOR A MOTOR VEHICLE

[75] Inventor: Philippe Lucienne, Aumont, France

[73] Assignee: Valeo, Paris, France

[21] Appl. No.: 525,668

[22] PCT Filed: Jan. 17, 1995

[86] PCT No.: PCT/FR95/00052

§ 371 Date: Dec. 15, 1995

§ 102(e) Date: Dec. 15, 1995

[87] PCT Pub. No.: WO95/19512

PCT Pub. Date: Jul. 20, 1995

[30] Foreign Application Priority Data

Jan. 18, 1994 [FR] France ............... 94 00467

[51] Int. Cl.[6] ............... F16F 15/133; F16F 15/12
[52] U.S. Cl. ............... 192/214.1; 74/574; 192/70.17
[58] Field of Search ............... 192/70.17, 55.61, 192/214.1, 214; 74/574; 464/66, 68

[56] References Cited

U.S. PATENT DOCUMENTS

| | | | |
|---|---|---|---|
| 4,732,250 | 3/1988 | Maucher et al. | 192/70.17 |
| 5,160,007 | 11/1992 | Reik et al. | 74/574 X |

FOREIGN PATENT DOCUMENTS

| | | |
|---|---|---|
| 0533426 | 1/1993 | European Pat. Off. |
| 4117571 | 12/1991 | Germany. |
| 4118686 | 12/1992 | Germany. |
| 4204342 | 8/1993 | Germany. |
| 2244543 | 12/1991 | United Kingdom. |

Primary Examiner—Rodney H. Bonck
Attorney, Agent, or Firm—Longacre & White

[57] ABSTRACT

A double damped flywheel including two coaxial masses (11A, 11B) mounted for rotation of one with respect to the other, with, interposed circumferentially between them, resilient members (12) which work between guide elements (43), fixed to the primary coaxial mass (11A). A drive plate (44) is fixed to the secondary coaxial mass (11B) having a reaction plate, and the drive plate (44) is shrunk on the flange (25) of the reaction plate (22).

5 Claims, 1 Drawing Sheet

DOUBLE DAMPED FLYWHEEL, ESPECIALLY FOR A MOTOR VEHICLE

BACKGROUND OF THE INVENTION

1. Field of the Invention

This invention relates to a double damped flywheel, especially for a motor vehicle, of the kind comprising two coaxial masses, one primary and the other secondary, which are mounted for rotation of one with respect to the other, and one of which, namely the secondary coaxial mass, comprises a plate that constitutes the reaction plate of a clutch, with, interposed circumferentially between the said coaxial masses, resilient members which work between guide means fixed to the primary coaxial mass, and a drive plate which is fixed to the secondary coaxial mass.

2. Description of the Prior Art

Such a double damped flywheel, also known as a divided flywheel, is described in particular in the documents DE-A-41 18 686 and DE-A-41 17571.

In the document DE-A-41 18 686, the drive plate, which is in practice a sheet metal component, is in engagement through an axial portion with the end face of the plate of the secondary coaxial mass, and, apart from any probable seaming of the said axial portion on to the said end face, it is essentially fixed to this plate by means of lugs, which are bent at right angles to the back face of the latter and are appropriately bolted or riveted to it.

Apart from the fact that this results in a quite complex construction of the drive plate, it is necessary to reduce the plate at its outer periphery by the provision of a rebate for accommodating the lugs of the drive plate at this point, thus giving rise to the risk of a reduction in the mechanical strength of the said plate.

In the document DE-A-41 17 571, the drive plate extends radially as far as the inner periphery of the plate, so as to be secured to the latter in the vicinity of its inner periphery.

The drive plate is thus inserted axially between the plate of the secondary coaxial mass and the plate which jointly forms part of the primary coaxial mass, to the detriment of the axial size of the assembly.

In addition, in both cases the resilient members are disposed entirely radially outside the peripheral edge of the plate of the secondary coaxial mass, to the detriment of the diametral size of the assembly.

If, in order to reduce this diametral size, there is provided on the back face of the plate of the secondary coaxial mass an inclined surface which, with the plate of the primary coaxial mass, defines a chamber in which the resilient members are able to be at least partly engaged radially, the result is, as before, a reduction in the mechanical strength of the plate of the secondary coaxial mass at its outer periphery.

It is then necessary to make this plate as a particularly strong casting, for instance as a relatively expensive casting of the GS type, especially when it has an annular flange at the said outer periphery.

An object of the invention is a double damped flywheel in which a particular arrangement of the drive plate enables these drawbacks to be avoided, and which, in addition, leads to further advantages.

SUMMARY OF THE INVENTION

This double damped flywheel, which is of the kind defined above, is characterised in that the drive plate is shrunk on to the secondary coaxial mass at the outer periphery of the latter.

In this way, the drive plate is used for reinforcing the mechanical strength of the secondary coaxial mass, and more precisely that of its plate at the outer periphery of the latter.

An advantage is that it is then possible, without there being any need to make the said plate as a particularly strong casting, to provide on the back face of this plate an inclined surface which enables the resilient members to be at least partly engaged radially behind it, to the benefit of the diametral size of the assembly.

In addition, the drive plate has the advantage of remaining simple.

The drive plate is preferably shrunk, by means of an axial portion, on to a flange of the secondary mass to which the cover plate of the clutch is secured by screw fastening.

A result of the invention is that it is possible for only a small thickness of material to exist between the screw fasteners and the axial portion of the plate, which makes it possible to increase the radial size of the friction disc of the clutch.

The features and advantages of the invention will appear more clearly from the description that follows, by way of example, with reference to the attached diagrammatic drawings, in which:

DETAILED DESCRIPTION OF THE PREFERRED EMBODIMENT

Figure 1:
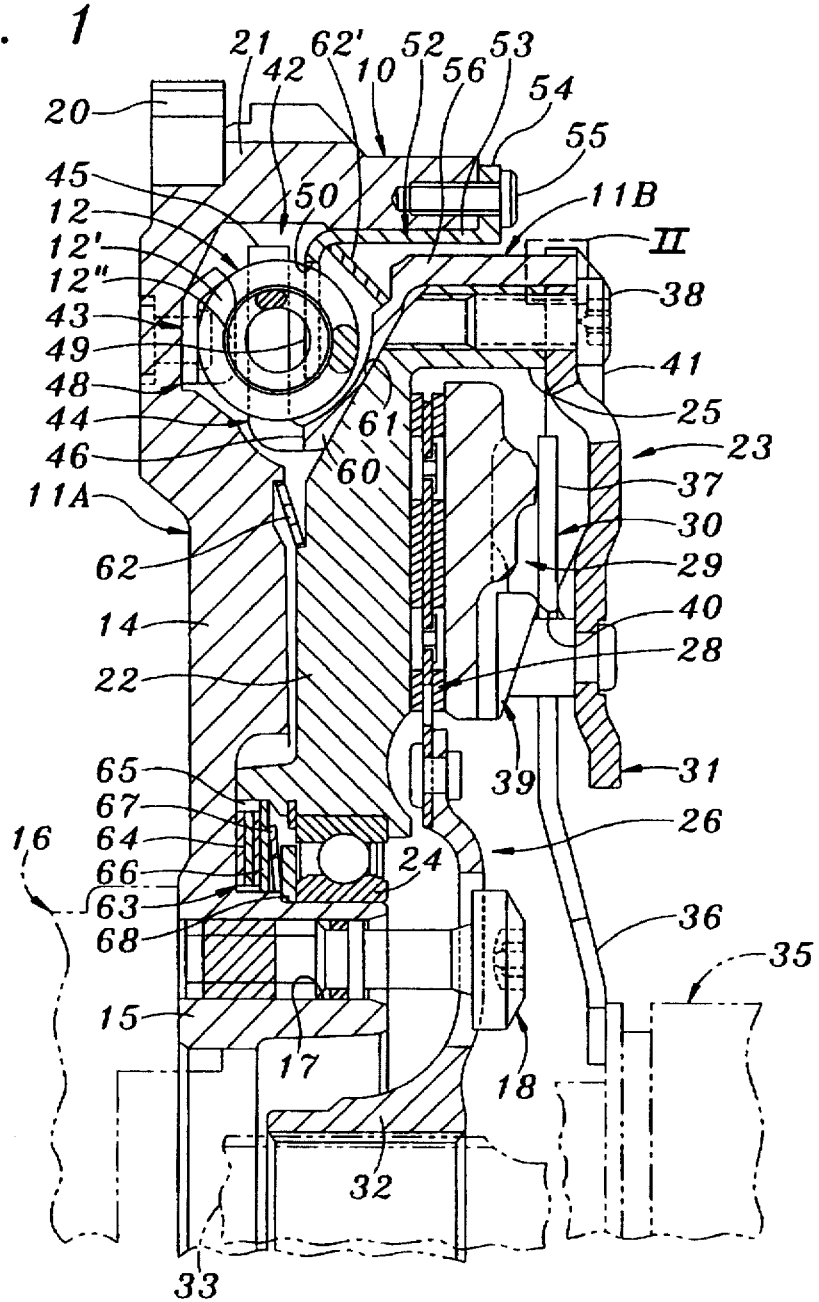
FIG. 1 is a half view in axial cross section, of a double damped flywheel in accordance with the invention.
Figure 2:
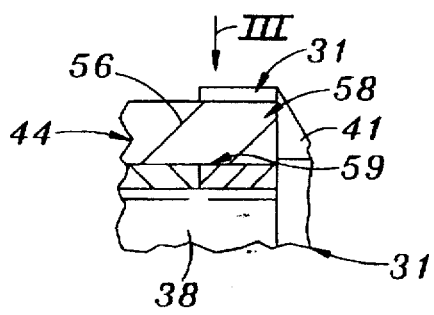
FIG. 2 repeats on a larger scale the detail of FIG. 1 which is indicated in a box II in the said FIG. 1.
Figure 3:
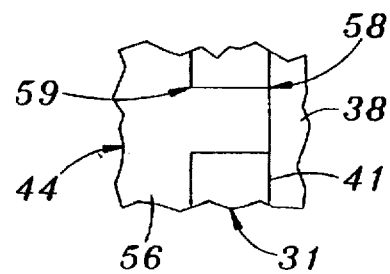
FIG. 3 is a partial plan view of the double damped flywheel in accordance with the invention, seen in the direction of the arrow in FIG. 2.

The double damped flywheel 10 shown in these Figures is intended for use in a motor vehicle.

It comprises two coaxial masses 11A, 11B, one primary, the other secondary, mounted for rotation of one with respect to the other, with resilient members 12 interposed circumferentially between the said coaxial masses 11A, 11B in accordance with arrangements to be described later herein in more detail.

The primary coaxial mass 11A comprises a transverse plate 14 which, in this example, is integral with a hub 15 at its inner periphery.

For fastening the assembly to a driving shaft 16, in this case the output shaft or crankshaft of the engine, the said hub 15 has through holes 17 which are spaced along a pitch circle, and in which studs 18 are disposed in a ready position.

To this end, the stud 18 has, between its threaded portion and its head, a smooth portion having a collar portion close to its threaded portion. The collar portion provides a shoulder for a ring of resilient material which is fitted between the threaded portion and the collar portion. The resilient ring is force fitted (under precompression) in the hole 17, and serves to retain the stud.

In this example the plate 14 carries a starter crown 20 at its outer periphery, and it has an axially oriented annular flange 21, integral in this example, which extends parallel to the axis of the assembly.

The secondary coaxial mass 11B includes, again parallel to the plate 14 of the primary coaxial mass 11A, a plate 22, and the latter constitutes the reaction plate of a clutch 23.

3

The plate 22 is centred through its inner periphery on the hub 15 of the primary coaxial mass 11A, through an interposed ball bearing 24 or any other type of bearing whatsoever, and, for example, a plain bearing.

The plate 22 has at its outer periphery, integrally in this example, a flange 25, which, like the flange 21 of the plate 14 of the primary coaxial mass 11A, extends parallel to the axis of the assembly.

The clutch 23 comprises a clutch friction wheel 26, the friction disc 28 of which lies between the plate 22 and a pressure plate 29, which is permanently biassed towards the plate 22 by a diaphragm 30 which bears on a cover plate 31 fixed to the plate 22, and which includes a hub 32 through which it is adapted to be mounted in rotation on a driven shaft 33, which in this example is the input shaft of the gearbox.

Thus the primary coaxial mass 11A is mounted in rotation on a driving shaft 16, while, in service, when the clutch 23 is engaged, the secondary coaxial mass 11B is coupled in rotation with a driven shaft 33 through the interposed clutch friction wheel 26.

For disengagement of the clutch 23, a clutch release bearing 35 acts on the ends of the fingers 36 of the diaphragm 30.

The clutch 23 here is of the "push to release" type, in which the peripheral portion 37, constituting a Belleville ring, of the diaphragm 30 bears on the pressure plate 29 over a circumference having a diameter greater than that of the circumference along which it makes a primary engagement on the cover plate 31.

In this example, this cover plate 31 is attached by means of studs 38 on the flange 25 of the plate 22 at the end of the flange 25 and on the end face of the latter, while, for tilting mounting of the diaphragm 30 on the said cover plate 31, stub pieces 39, which provide a second, or secondary, engagement for the diaphragm 30 on the side of the latter opposed to the cover plate 31, are attached on the cover plate 31, being riveted to the latter in this example and passing by means of their shank through passages 40 which are provided for this purpose between the fingers 36 of the diaphragm 30 at the root of the said fingers 36.

In this example each of the studs 38 is located in a local recess in the cover plate 31.

The circumferentially acting resilient members 12 are spaced apart on a pitch circle around the axis of the assembly.

They are arranged in a chamber 42, which is generally bounded by the plate 14 of the primary coaxial mass 11A, the flange 21 of the said plate 14, and the secondary coaxial mass 11B, in accordance with arrangements to be described in greater detail later herein, and they work circumferentially between, firstly, guide means 43 which are fixed to the primary coaxial mass 11A, and secondly, and in accordance with arrangements which will also be described in greater detail later herein, a drive plate 44, which is fixed to the secondary coaxial mass 11B and which has a transverse portion 45 at right angles to the axis of the assembly, on which the said resilient members 12 act. This plate 44 is separate from the cover plate 31.

In this example, the transverse portion 45 of the drive plate 44 has openings 46 which are arranged at intervals along a pitch circle, and in each of which one resilient member 12 extends circumferentially, with or without a clearance.

In this example, these openings 46 are slots, while each of the resilient members 12 comprises, firstly, a first spring 12'

4 of the coil spring type, and secondly, a second spring 12", which is again of the coil spring type and which is disposed coaxially within the said spring 12'.

For cooperation with the guide means 43 through their circumferential ends, the resilient members 12 extend axially beyond and on either side of the transverse portion 45 of the drive plate 44.

In this example, the guide means 43 comprise pads 48 on a first side of the transverse portion 45 of the drive plate 44, which are attached at intervals on the plate 14 of the primary coaxial mass 11A, in this example by riveting, together with a ring portion 49 on the other side of the transverse portion 45 of the drive plate 44, which is parallel to the transverse portion 45 and has corresponding openings 50 for the resilient members 12.

In this example, this ring portion 49 is an integral part of a member 52 which, besides the said ring portion 49, includes a locating ring portion 53, by which it is laid against the internal surface of the flange 21 of the plate 14 of the primary coaxial mass 11A, and, at the end of the said locating ring portion 53, a flange 54 which extends at right angles to the axis of the assembly and away from the latter, and by means of which it is applied against the edge of the flange 21, being secured to the latter at intervals by means of screws 55.

In accordance with the invention, the drive plate 44 is shrunk on to the secondary coaxial mass 11B at the outer periphery of the latter.

In this example, it comprises an axially oriented annular portion 56, that is to say a portion which extends generally parallel to the axis of the assembly, and it is shrunk, through this axial portion 56, on to the secondary coaxial mass 11B, and more precisely on to the flange 25 of the plate 22 of the latter, in this example. The plate 44 is thus shrunk on to the external surface of the plate 22.

In other words, the drive plate 44 has an axial portion 56 around the flange 25 of the plate 22 and on the outside of the latter, while during fitting, it is fitted hot on the flange 25 by means of the said axial portion 56.

After being cooled, the drive plate 44 is therefore held by force on the flange 25 of the plate 22, on the outer periphery of the latter, which can be sufficient to secure it in rotation to the secondary coaxial mass 11B.

It will be appreciated that, because of the flange 25, the axial portion 56 is very long, and this assists good fastening of the plate 44.

In addition, the material between the portion 56 and the threaded holes formed in the flange 25 for the fastening screws 38 is very thin.

In general terms, because of the axial portion 56 of the plate 44 it is possible to reduce the thickness of the flange, and thus to increase the radial dimension of the friction disc 28.

It will be noted that the flange 21 of the plate 14 of the first mass partly surrounds the portion 56 and the flange 25, which enables the inertia of the first mass 11A to be increased.

However, in order to ensure that rotational coupling takes place, the drive plate 44 is meshed with the cover plate 31 of the clutch 23 in this example.

In the present case, the axial portion of the drive plate 44, which extends at right angles to the cover plate 31, meets the latter at right angles at the end of the flange 25 of the plate 22, and it has along its end face a set of teeth 58 by means of which it engages with a set of complementary teeth 59, which are arranged for that purpose along the radial face of the cover plate 31.

The sets of teeth 58, 59 may extend in a continuous circle along the whole of the drive plate 44 and cover plate 31.

However, they may equally well be arranged only at intervals along a circle.

In the present case the drive plate 44 also includes, between its transverse portion 45 and its axial portion 44, an oblique portion 60 which extends obliquely with respect to the axis of the assembly, so as to define a V-shaped axial cross section with the transverse portion 45, while the plate 22 of the secondary coaxial mass 11B has on its back surface a complementary peripheral inclined surface 61, with the oblique portion 60 of the drive plate 44 lying in contact with the inclined surface 61.

Thus, the chamber 42 in which the resilient members 12 are disposed has a wedge-shaped profile in transverse cross section, and by virtue of the inclined surface 61 of the plate 22 of the secondary coaxial mass 11B, it extends radially towards the axis of the assembly, between the plate 22 and the plate 14 of the primary coaxial mass 11A. This chamber 42 is partly filled with grease for lubrication of the springs 12.

Consequently, the resilient members 12 are at least partly engaged radially behind the plate 22 of the secondary coaxial mass 11B, between the latter and the plate 14 of the primary coaxial mass 11A, by virtue of the inclined surface 61 of the plate 22.

In this example, the resilient members 12 are disposed entirely radially within the circumference along which the outer surface of the axial portion 56 of the drive plate 44 extends.

In addition, the outer surface of the oblique portion 60 of the drive plate 44 has, in the present case, a convex profile in axial cross section, matching the contour of the resilient members 12.

In this example a sealing ring 62 extends obliquely from the plate 14 of the primary coaxial mass 11A to the plate 22 of the secondary coaxial mass 11B, between the chamber 42 and the axis of the assembly, so as to isolate the chamber 42 at this level, while a sealing ring 62' similarly extends obliquely from the member 52 that defines the ring 49 to the drive plate 44, so as to isolate the chamber 42 at that level.

It will be appreciated that an inclined engagement surface is formed for the ring 62' in the junction zone between the oblique portion 60 and the axial portion 56 of the plate 44. The configuration of the plate 44 thus permits easy fitting of the sealing ring 62'.

Damping means 63 are also arranged in this example between the coaxial masses 11A, 11B.

In the present case these damping means are interposed at the level of the ball bearing 24. They comprise a friction ring 64 which has at its outer periphery a set of teeth, by means of which it meshes with a set of teeth 65 of the plate 22 of the secondary coaxial mass 11B.

This friction ring 64 is subjected, through a spacer ring 66, to an axially acting resilient ring 67, which, by engaging on the inner ring of the ball bearing 24 through an interposed spacer ring 68, holds it flat against the plate 14 of the primary coaxial mass 11A, and which has a generally frusto-conical form in this example.

In the present case the ring 68 serves as an abutment for the inner ring of the ball bearing 24, and the ring 67 is mounted on the hub 15 for rotation with it.

For example, the ring 67 may have at its inner periphery, in a manner known per se, lugs which are engaged in grooves formed at the outer periphery of the hub 15.

The present invention is of course not limited to the embodiment described and shown, but embraces all practical variants.

In particular, the springs 12 may in some cases be unlubricated, so that it is then not obligatory to provide the rings 62, 62'.

I claim:

1. A double damped flywheel comprising two coaxial masses (11A, 11B), one primary and the other secondary, which are mounted for rotation of one with respect to the other, said secondary coaxial mass (11B) comprising a reaction plate (22) that constitutes the reaction plate of a clutch (23), with, interposed circumferentially between said coaxial masses (11A, 11B), resilient members (12) which work between guide means (43) fixed to the primary coaxial mass (11A), and a drive plate (44) which is fixed to the secondary coaxial mass (11B), wherein, the drive plate (44) includes an axial portion (56) by which it is shrunk on to the secondary coaxial mass (11B) at the outer periphery of the latter, and the drive plate (44), which includes a transverse portion (45) on which the resilient members (12) work further includes an oblique portion (60) between said transverse portion (45) and its axial portion (56), while the reaction plate (22) of the secondary coaxial mass (11B) has a peripheral inclined surface (61) on its back face, and the oblique portion (60) of the drive plate (44) lies in contact with the inclined surface (61).

2. A double damped flywheel according to claim 1, wherein the reaction plate (22) of the secondary coaxial mass (11B) has an annular flange (25) at its outer periphery, and the drive plate (44) is shrunk on to the said flange (25) by means of its axial portion (56).

3. A double damped flywheel according to claim 2, wherein the clutch (23) associated with the reaction plate (22) of the secondary coaxial mass (11B) includes a cover plate (31) fixed to said reaction plate (22), and the driver plate (44) meshes with said cover plate (31) and the axial portion (56) of the drive plate (44) includes along its end face a set of teeth (58), by which it is in engagement with a complementary set of teeth arranged for that purpose along the radial face of the cover plate (31).

4. A double damped flywheel according to claim 1, wherein, the resilient members (12) are at least partially disposed axially behind the reaction plate (22) of the secondary coaxial mass (11B) by virtue of the inclined surface (61) of said reaction plate (22).

5. A double damped flywheel according to claim 1, wherein, the resilient members (12) are disposed entirely radially inwards of the circumference along which the outer surface of the axial portion (56) of the drive plate (44) extends.

* * * * *